United States Patent
Fischer

(10) Patent No.: US 9,435,629 B2
(45) Date of Patent: Sep. 6, 2016

(54) MEASURING PROBE WITH SHIELDING ELEMENT FOR MEASURING THE THICKNESS OF THIN LAYERS

(75) Inventor: Helmut Fischer, Oberägeri (CH)

(73) Assignee: Helmut Fischer GmbH Institut für Elektronik und Messtechnik, Sindelfingen (DE)

( * ) Notice: Subject to any disclaimer, the term of this patent is extended or adjusted under 35 U.S.C. 154(b) by 205 days.

(21) Appl. No.: 14/119,971

(22) PCT Filed: May 24, 2012

(86) PCT No.: PCT/EP2012/059690
§ 371 (c)(1),
(2), (4) Date: Feb. 18, 2014

(87) PCT Pub. No.: WO2012/160131
PCT Pub. Date: Nov. 29, 2012

(65) Prior Publication Data
US 2014/0225602 A1    Aug. 14, 2014

(30) Foreign Application Priority Data

May 25, 2011   (DE) .................. 10 2011 103 122
May 25, 2011   (DE) .................. 10 2011 103 123

(51) Int. Cl.
G01B 7/06 (2006.01)
(52) U.S. Cl.
CPC .................. *G01B 7/10* (2013.01); *G01B 7/105* (2013.01); *Y10T 29/49071* (2015.01)
(58) Field of Classification Search
CPC .......... G01B 7/10; G01B 7/105; G01B 7/06; Y10T 29/49071
USPC .................................. 324/228–243
See application file for complete search history.

(56) References Cited

U.S. PATENT DOCUMENTS 2,933,677 A * 4/1960 Lieber .................. G01B 7/105
324/230
3,855,561 A   12/1974 Gottschalt
(Continued)

FOREIGN PATENT DOCUMENTS

DE   33 31 407 C2   3/1985
DE   100 14 348 B4   9/2001
(Continued)

OTHER PUBLICATIONS

International Search Report for corresponding Patent Application No. PCT/EP2012/059690 dated Aug. 23, 2012.
(Continued)

*Primary Examiner* — Jay Patidar
(74) *Attorney, Agent, or Firm* — Renner, Otto, Boisselle & Sklar, LLP

(57) ABSTRACT

The invention relates to a measuring probe for measuring the thickness of thin layers, having a housing (14) with at least one sensor element (17), which is received at least slightly moveably along a longitudinal axis (16) and which comprises at least one first winding device (44), which has a magnetic pot core (41) arranged in the longitudinal axis (16) of the housing (14), and to whose central pin (42) a first and second coil (70, 71) are allocated, and having a spherical positioning cap (21) on the central pin (42) pointing towards the measuring surface of an object to be measured, which cap comprises a bearing surface (57) for fitting on a measuring surface, wherein a second winding device (48) is provided allocated to the spherical positioning cap (21), which device is formed from a discoidal or annular carrier (49) having at least one Archimedean coil (51), and a shield (83, 85) is provided at least partially between the first and second winding device (44, 48).

17 Claims, 3 Drawing Sheets

(56) References Cited

U.S. PATENT DOCUMENTS

Figure 1:
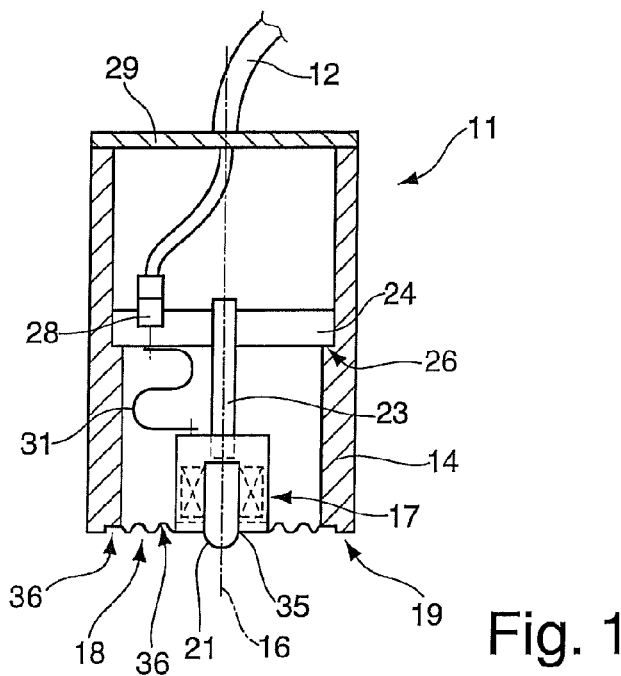

| | | | | |
|---|---|---|---|---|
| 3,986,105 A | * | 10/1976 | Nix | G01B 7/105 324/230 |
| 4,041,378 A | * | 8/1977 | Ott | G01B 7/105 324/230 |
| 4,618,825 A | | 10/1986 | Fischer | |
| 5,421,946 A | * | 6/1995 | Flaig | 156/361 |
| 5,886,522 A | | 3/1999 | May | |
| 6,977,498 B2 | * | 12/2005 | Scherzinger | G01B 7/105 324/229 |
| 2003/0090266 A1 | | 5/2003 | Kesil et al. | |

FOREIGN PATENT DOCUMENTS

| | | |
|---|---|---|
| DE | 103 48 652 A1 | 5/2004 |
| DE | 10 2005 054 593 A1 | 5/2007 |
| DE | 699 35 610 T2 | 11/2007 |
| EP | 02 03 536 B1 | 8/1989 |
| JP | 52155561 A | 12/1977 |
| JP | 60196602 A | 10/1985 |
| JP | 2001 255108 A | 9/2001 |
| JP | 2005 227256 A | 8/2005 |
| JP | 2007 139769 A | 6/2007 |
| JP | 2010 122220 A | 6/2010 |
| WO | 0034734 A1 | 6/2000 |
| WO | 2010/044670 A2 | 4/2010 |

OTHER PUBLICATIONS

Japanese Office Action with English translation for corresponding Japanese Patent Application No. 2014-511869 mailed Jan. 26, 2016.

* cited by examiner

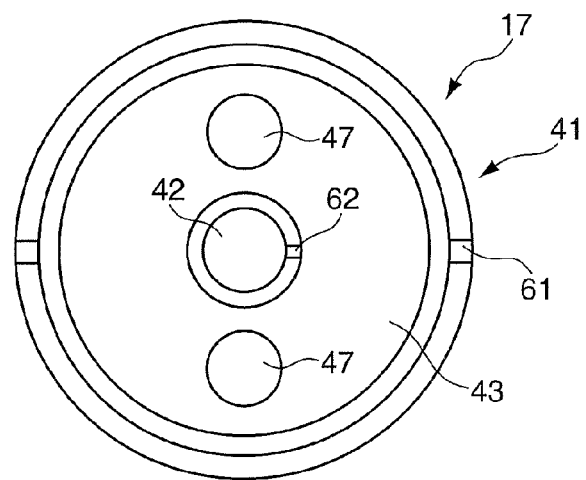
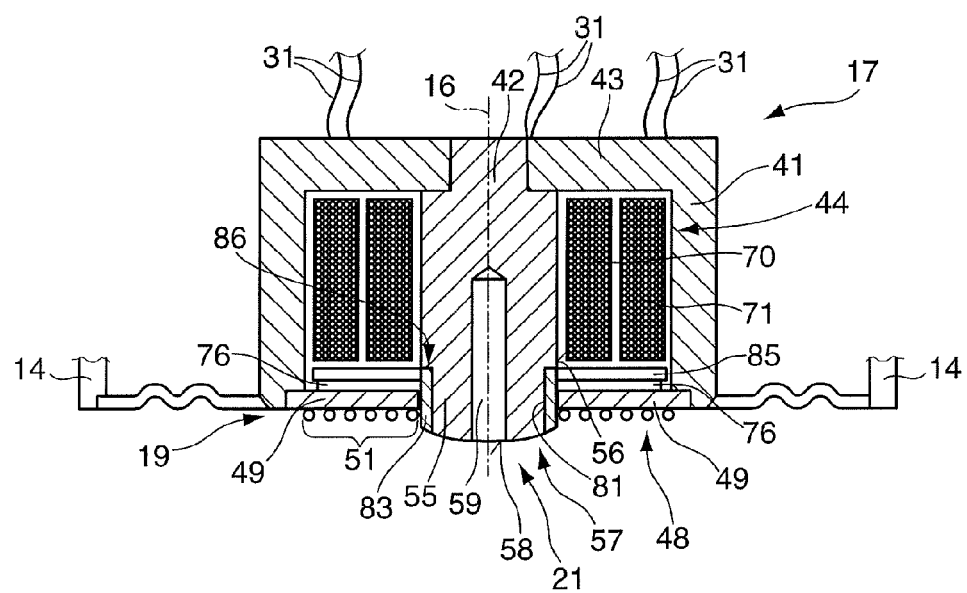

MEASURING PROBE WITH SHIELDING ELEMENT FOR MEASURING THE THICKNESS OF THIN LAYERS

The invention relates to a measuring probe for measuring the thickness of thin layers according to the preamble of claim 1.

A measuring probe for measuring the thickness of thin layers is known from DE 10 2005 054 593 A1. This measurement comprises a housing in which at least one sensor element is provided, which is received in the housing at least slightly moveably in the core of a longitudinal axis of the housing. The sensor element comprises at least one winding device, which is received by a pot core. The pot core comprises a central pin, on whose end facing the housing a spherical positioning cap is provided. The pot core with the sensor element arranged thereon and the spherical positioning cap is received by an elastically flexible holding element, which is fastened to a front end of the housing. Such a measuring probe can be designed for measuring the layer thickness according to the magnetic induction method, wherein the thickness of non-ferrous metals on magnetic base materials can be determined non-destructively. For this purpose, the first winding device comprises a first and second coil. Likewise, this measuring probe is also suitable for measuring layer thickness according to the eddy current method, wherein the thickness of electrically non-conductive layers on non-ferrous metal can be determined non-destructively. For this, the sensor element is designed as a Hall effect sensor.

Furthermore, probes are known that can be used for the magnetic induction measuring method as well as in accordance with the eddy current method.

The specifications for the measuring accuracy of the measuring devices are always increasing. This means that the measuring devices do not only have to be designed smaller in order to eliminate geometric disturbances, such as bent measuring surfaces and to achieve a larger field of application, but they must also have a smaller mass, such that these can be fitted virtually without having a negative impact on the measuring surface.

The object of the invention is to create a measuring probe wherein the increased specifications for measuring accuracy are fulfilled, wherein a measuring probe is to be provided with which the measurement is enabled both according to the magnetic induction method and according to the eddy current method.

This object is solved according to the invention by a measuring probe wherein, in addition to a first winding device allocated to the spherical positioning cap, a second winding device is allocated, which consists of a discoidal or annular carrier having at least one Archimedean coil, wherein a shield, in particular made from a ferritic material, is provided at least partially between the first and second winding device. This arrangement makes it possible for both the magnetic induction measuring method and the eddy current method to each be able to be carried out without reciprocal influence and interference, wherein, at the same time, both winding devices can be positioned spatially close to each other. In particular, due to the embodiment of the second winding device, which is formed from a discoidal or annular carrier having at least one Archimedean coil, which encloses the spherical positioning cap, the winding devices can be guided close to a measuring surface of the object to be measured, whereby the measuring sensitivity is improved and thus the measuring accuracy is increased. Due to this embodiment of the at least one Archimedean coil of the second winding device, which carries out the measurement according to the eddy current method, the high-frequency field can be guided virtually directly onto the measuring surface, whereby the very high sensitivity of the measuring probe, and thus a high resolution, can be achieved in order to also record thinner layers tactilely.

The spherical positioning cap of the measuring probe is preferably produced from a magnetically soft material in order to better guide the magnetic field lines to the measuring surface during the magnetic induction measurement. According to a first embodiment, the spherical positioning cap is formed as part of a central pin of the pot core, which receives the first winding device. Alternatively, the spherical positioning cap can be produced from a magnetically soft material and can be fastened to the pot core. This embodiment can, for example, use standardised pot cores on the one hand and, on the other hand, spherical positioning caps that are adapted to various measuring tasks.

The spherical positioning cap has a rounded bearing surface, in which a pole cap is provided, which consists of a hard metal coating according to a first embodiment. Thus, a high level of wear resistance can be enabled for a simple construction of such a spherical positioning cap. Such a hard metal coating can be finished by polishing. For example, the coating can be formed by a TiC coating. The layer thickness of this can be from 1 µm to 10 µm, in particular 2 µm.

Alternatively, the pole cap of the bearing surface of the spherical positioning cap is formed by a hard metal core or hard metal pin, which advantageously extends at least partially along the longitudinal axis of the spherical positioning cap from the bearing surface in the direction of the pot core. Thus, an increased level of wear resistance can likewise be provided.

The at least partially formed shield between the first and second winding device in the measuring probe can be formed by a ferritic sleeve, which is arranged on a tapered section of the spherical positioning cap that is aligned with respect to the bearing surface. The ferritic sleeve is thus provided on the external periphery of the spherical positioning cap, wherein the external peripheral face of the ferritic sleeve preferably merges flush into an external periphery of the spherical positioning cap or the pot core. This ferritic sleeve can enable a shielding in the radial direction towards the second winding device compared to the section of the spherical positioning cap consisting of a magnetically soft material. Thus it is also enabled that, between the ferritic sleeve and a hard metal core that is in particular introduced in the longitudinal axis of the spherical positioning cap, or a hard metal coating provided therein as a pole cap located therebetween, the magnetically soft material of the spherical positioning cap extends up to the bearing surface in order to introduce flux lines of the magnetic field directly onto the measuring surface during the magnetic induction measuring method by means of the first winding device.

The front face of the ferritic sleeve is preferably located in the bearing surface and is rounded with this. Thus, the second winding device can also be positioned close to the bearing surface.

The ferromagnetic sleeve preferably extends from the bearing surface of the spherical positioning cap towards the pot core in such a way that the length of the sleeve is designed to be greater than the thickness of the second winding device. This supports the shielding and influence during the low-frequency magnetic induction measurement.

Furthermore, a further shielding element made from ferritic material is preferably provided between the first and second winding device in the pot core, which forms a shield in the axial direction. The same effect as described above can in turn be achieved by this separation. Moreover, during the high-frequency measurement, the eddy current field is concentrated towards the measuring surface, whereby the eddy current effect is increased.

The shielding element is preferably formed as a perforated disc or perforated film, which extends between the central pin and an inner peripheral wall of the pot core. Thus, the shielding element can be formed as a simple insert.

An overlap region is formed between the ferritic sleeve and the shielding element for complete shielding between the first and second winding device and to the basic body of the spherical positioning cap consisting of a magnetically soft material. Two separate shielding elements can thus form a mutual, complete shield.

The at least one Archimedean coil of the second winding device is preferably positioned pointing outwards towards the front of the housing. Thus, this coil can be guided even closer to the measuring surface.

According to a further preferred embodiment of the second winding device, a second Archimedean coil is arranged on the carrier, which encloses the first Archimedean coil. This second Archimedean coil is provided to compensate for bending, wherein the first, preferably inner, Archimedean coil is used to measure layer thickness.

The first and second Archimedean coil of the second winding device lie, according to a first embodiment, on the same side of the carrier. Alternatively, these can also be arranged respectively on an opposite side of the carrier, wherein the inner coil preferably points towards the front of the housing and the outer Archimedean coil, which is arranged outside the inner coil, is provided on the carrier, pointing towards the second winding device.

An alternative embodiment provides that the first and second coil are each arranged on one side of the carrier and that these are arranged at least partially overlapping each other. Thus, the diameter of the second winding device can be reduced even further, wherein it is likewise possible to carry out the measurement of layer thickness according to the eddy current method with compensation for bending.

The carrier furthermore consists of a semi-conductive material and comprises an implemented or inscribed circuit for the first winding device. Silicon or germanium, for example, can be used as the semi-conductive material. This arrangement enables a compact and constructionally small measuring probe. Such a discoidal carrier can, for example, have an outer diameter of a pot core or even a smaller outer diameter, such that a direct mounting onto, and integration into, the pot core, or a front closure of the pot core, is enabled by the discoidal carrier. Furthermore, the integration of the circuit into the carrier has the advantage that a simple circuitry arrangement and line connection to the further winding device is provided.

Furthermore, the carrier can alternatively be arranged with a circuit implemented or inscribed therein on an outer side of the pot core or in the pot core or in front of the pot core facing an outer side of the housing. Depending on the construction, a corresponding selection can be made in order to further increase the compactness of such a measuring probe. Furthermore, the carrier having the implemented circuit can be arranged between the first and second Archimedean coil of the second winding device.

Furthermore, the holding element to receive the sensor element preferably comes into contact with a front face or a section of the pot core facing the front face, and on the opposite side, with a front end of the housing, and receives the sensor element with at least slightly elastic mounting.

Due to this frontal receiving of the sensor element on the outer edge region of the pot core, the second winding device can be guided even more closely to the measuring surface. In addition, there is no interference provided by covering the holding element.

Figure 2:
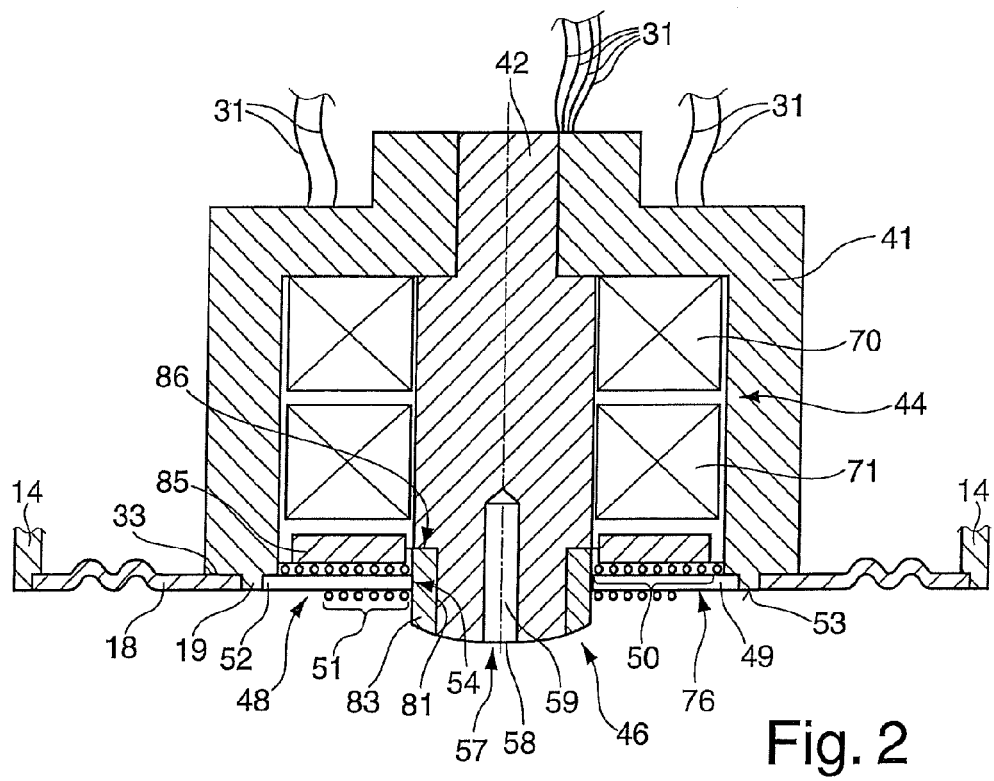

The invention and further advantageous embodiments and developments of the same are described and illustrated in greater detail below with the aid of the examples depicted in the drawings. The features to be gleaned from the description and the drawings can be applied according to the invention individually or together in any combination. Here are shown:

FIG. 1 a schematic sectional depiction of a first embodiment of the measuring probe according to the invention, FIG. 2 a schematically enlarged sectional view of the sensor element of the measuring probe according to FIG. 1, FIG. 3 a schematic view onto the embodiment according to FIG. 2, and FIG. 4 a schematic sectional view of an alternative embodiment to FIG. 2.

Figure 5:
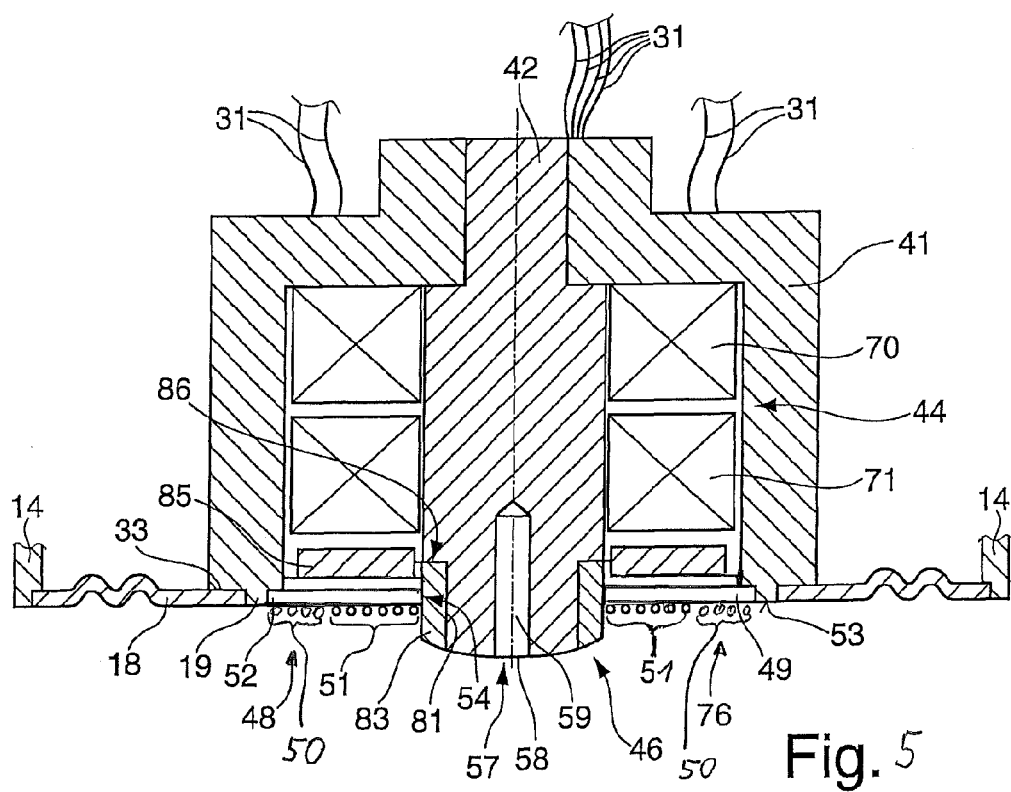

FIG. 5 a schematic sectional view of another alternative embodiment to FIG. 2.

A sectional view of a measuring probe 11 for a device (not shown in greater detail) for measuring the thickness of thin layers is depicted schematically in FIG. 1. This measuring probe 11 is used for non-destructive measurement of layer thickness. This measuring probe 11 can, according to the exemplary embodiment, be provided separately from the data processing device of the device for measuring the thickness of thin layers and can transfer the recorded values via a connecting cable 12 or wirelessly. Alternatively, this measuring probe 11 can be part of the device for measuring the thickness of thin layers in the form of a stationary device or a hand-held device.

The measuring probe 11 has a housing 14, which is in particular formed cylindrically. At least one sensor element 17 is preferably arranged in a longitudinal axis 16 of the housing 14. This sensor element 17 is borne by a holding element 18, which is received on an end section 19 of the housing 14. A sensor element 21 is provided on the at least one spherical positioning cap 17 in the longitudinal axis 16 of the housing 14, which positioning cap can, during the fitting of the measuring probe 11, be positioned on a measuring surface of an object to be measured that is not depicted in greater detail, in order to determine a layer thickness on a base or carrier material.

The at least one sensor element 17 has, for example, a guide element 23 arranged coaxially with respect to the longitudinal axis 16, which guide element is displaceably received in a bearing 24 fixed to the housing. The precision for a tilt-free fitting movement of the measuring probe 11 on the measuring surface of the object to be measured is thus increased. The bearing 24 can be formed as an air bearing or low-friction plain bearing. This bearing 24 that is fixed to the housing is preferably arranged on a collar 26 of the housing 14, whereby, in turn, a simple and fast positioning of the bearing 24 is enabled in the radial and axial direction. The bearing 24 furthermore comprises a connector 28, which is provided to connect the connecting cable 12. Depending on the purpose, the housing 14 can be completed accordingly. In order to embody a stand-alone probe according to the exemplary embodiment, the housing 14 is, for example, closed with a cover 29 or lid after the connection of the connecting cable 12, such that a hand-operated measuring probe is connected to a stationary device via a connecting cable 12. When there is insertion into a hand-operated measuring probe or into a stationary device, the cover 29 can be dispensed with.

A flexible line 31 with several individual wires or a flexible conduction band is provided on the bearing 24 between the sensor element 17 and, for example, the connector 28, which conduction band withstands bending stress. Such bending stress is effected by the lifting movement of the at least one sensor element 17 during the fitting of the probe on the surface of an object to be measured. In this instance, the sensor element 17 is dipped at least slightly into the housing 14. The holding element 18 is positioned in a depression 36 on the end section 19 of the housing 14.

The discoidally-formed holding element 18 is preferably fastened to a housing-end-side depression 33 on the end section 19. Thus, in turn, a radial and axial configuration is ensured in a simple manner. In a first embodiment, the holding element 18 is fastened media-impermeably in the depression 33. At the same time, the sensor element 17 is provided media-impermeably with its housing 14 in a borehole 35 of the holding element 18. Thus the housing 14 is hermetically sealed from the outside, such that an interference to the fitting movement and thus the dipping of the at least one sensor element 17 into the housing 14 is not provided by contamination.

The arrangement and assembly of the at least one sensor element 17 in the measuring probe 11 is only exemplary. Other embodiments of a measuring probe 11 for the longitudinally displaceable mounting of the at least one sensor element 17 in the housing 14 can also be provided.

A first embodiment of the sensor element 17 for the measuring probe 11 according to FIG. 1 is depicted with schematic enlargement in FIG. 2. The sensor element 17 comprises a pot core 41 formed as a housing, having a central pin 42, whereby an annular receiving space is formed. A first winding device 44 is arranged in this receiving space. This first winding device 44 comprises a first and second coil 70, 71, which are formed as multilayer, wound coils and are configured to carry out thickness measurement according to the magnetic induction method. The magnetic induction measuring method is suitable for measuring non-ferrous metallic layers such as, for example, chromium, copper, zinc or suchlike, on magnetic base materials such as steel or iron, and is also suitable for paint, lacquer and plastic layers on magnetic base materials such as steel and iron. The measuring range is, for example, at a layer thickness of up to 1800 µm; a frequency of less than 300 Hz is preferably used. The pot core 41 and the central pin 42 are produced from a magnetically soft material, in particular soft iron.

A second winding device 48 is arranged in a front end section 46 of the pot core 41, which is part of the spherical positioning cap 21 according to FIG. 2 and points towards the outer front face of the housing 14. This second winding device 48 comprises a discoidal carrier 49, on which a coil 51 is provided preferably in a single layer in an Archimedean manner. The coil 51 is arranged pointing towards the outer front side of the housing 14 and borders the spherical positioning cap 21. On the opposite side, according to the exemplary embodiment, a second coil 50 is also arranged on the carrier 49, as this in turn extends radially outwards bordering the spherical positioning cap 21. The carrier 49 has a central opening 54, through which the spherical positioning cap 21 extends, which is either fastened to the central pin 42 or represents an elongation of the central pin 42. The carrier 49 is preferably arranged on an inner peripheral collar 52 of the pot core 41 or on a plane formed by the front face 53 of the pot core 41.

The Archimedean coil 50, 51 can be produced from a metallic conductive layer on the carrier 49, in particular a copper layer. This can have a thickness of less than 0.1 mm, for example. The thickness is particularly in a region of approximately 0.01 mm. Then the Archimedean coil is produced by means of laser removal, wherein a line width of, for example, 0.019 mm preferably remains at a thickness of 0.01 mm and a space in a range from 0.1 mm to 0.05 mm, in particular 0.01 mm, remains between the individual windings. An insulating layer or protective layer that is not depicted in greater detail can be applied to this coil 50, 51, for example in the form of a lacquer or similar.

Alternatively, the coil 50, 51 can also be applied to the carrier 49 by an etching method. Likewise, a vapour deposition method of metallic layers onto the carrier 49 is also possible for the formation of the coil 50, 51. Winding the coils is a further possibility.

The second winding device 48 enables the carrying out of a measurement according to the eddy current method, i.e. the measurement of the thickness of electrically non-conductive layers on non-ferrous metals, for example of paints, lacquers, plastics on aluminium, copper, brass, stainless steel or other anodized layers made from aluminium is enabled in a high-frequency alternating field. Here, an alternating field with a frequency of at least 1 HMz is applied.

The spherical positioning cap 21 is, according to FIG. 2, formed as part of the central pin 42 and has a rounded bearing surface 57 with respect to the surface of an object to be measured. A pole cap 58 is formed within the rounded bearing surface 57, which, for measuring the thickness of thin layers, is supported as a bearing surface on a coated object. The pole cap 58 consists, for example, of a hard metal coating or, as is depicted in the exemplary embodiment, a hard metal insert or a hard metal pin, for example made from TiC, TiN or Ti(c,n).

Alternatively, a hard metal solid ball or hard metal half ball can also be provided, which is inserted, impressed or adhered into the spherical positioning cap 21 and which forms the pole cap 58.

The spherical positioning cap 21 has a tapered region 81 on the outer edge region of the rounded bearing surface 57, which tapered region is formed as a tiered abutting face. This tapered region 81 is formed with a smaller diameter than the outer periphery of the central pin 42. A sleeve 83 made from ferritic material is arranged or provided in this tapered region 83, which sleeve serves to shield the second winding device 48 in the radial direction towards the spherical positioning cap 21.

This sleeve 83 made from ferritic material is formed flush with the rounded bearing surface 57 of the spherical positioning cap 21. Alternatively, the front face pointing towards the measuring surface, which is opposite the rounded bearing surface 57 of the spherical positioning cap 21, can spring back. The sleeve 83 of the ferritic material extends in the longitudinal direction parallel to the longitudinal axis 16, at least so far in the direction towards the first winding device 44 that this, as seen in the radial direction, is arranged to at least partially cover the second winding device 48. The length of the sleeve 83 preferably extends out over the second winding device 48 in the direction of the first winding device 44. This sleeve 83 represents a first element of a shield between the first and second winding device 44, 48.

A shielding element 85 is provided in an intermediate space between the central pin 42 and the pot core 41, which shielding element furthermore shields the first and second winding device 44, 48 from each other. This shielding element 85 is likewise formed from ferritic material and preferably has a discoidal contour. This shielding element 85 can also be, for example, a ferritic film. This preferably covers the inner coil 50. Pointing towards the longitudinal axis, provision is preferably made for the shielding element 85 and the sleeve 83 to have an overlap region 86, such that these preferably adjoin each other.

For the second winding device 48, the coil 50 has a greater diameter than the coil 51 on the front side. Thus, the coil 51 serves to measure the layer thickness. The coil 50 is used to measure a curvature in the object to be measured, which deviates from the plane. Thus can the influence of curvature be compensated for. The field of the coil 71 is shielded by the shield by means of the sleeve 83 and the shielding element 85. The shielding element 85 has very low permeability, such that the low-frequency field remains virtually uninfluenced and the low-frequency measuring effect of the first winding device 44 is not weakened.

For the eddy current measurement, the shielding element 85 has the advantage that the windings of the coil 71 do not reduce the measuring effect. In fact, the rear field of the coil 50 is not reduced with respect to the measuring effect. Thus, the field is concentrated and reinforces the eddy current effect. Due to the sleeve 83 made from ferritic material on the spherical positioning cap 21, the eddy current field is shielded from the spherical positioning cap 21 or the magnetically soft section that leads to the rounded bearing surface 57 by means of the second winding device 48 during the eddy current measurement, in order to not have an influence on the measuring effect during eddy current measurement by means of high frequencies.

In the embodiment depicted in FIG. 2, provision is preferably made for the carrier 49 itself to receive a circuit 76. Alternatively, the circuit can also be provided between the coil 50 of the second winding device 44 and the shielding element 85, or between the shielding element 85 and the coil 71 or even between the pot core 41 and the coil 70. Likewise, the circuit can also be fastened thereto outside the pot core 41.

A schematic top view onto the pot core 41 according to FIG. 2 is depicted in FIG. 3. A groove 61 is provided on the outer periphery of the pot core 41, with which connecting lines are guided into the housing interior of the measuring probe 11. Furthermore, a groove 62 can be arranged in the central pin 42 of the pot core 41, which also enables a free space for guiding connecting lines for the first and second winding device 44, 48. The lines can also be guided out of the pot core 41 via an opening 47 in the base 43 of the pot core 41.

An alternative embodiment to FIG. 2 is depicted in FIG. 4.

This embodiment is different to the effect that the second winding device 48 only comprises one Archimedean coil 51 for measuring the layer thickness. The circuit 76 and the shielding element 85 are arranged on the opposite side of the carrier 49, for example. Incidentally, reference can be made to the above embodiments.

A dual measuring probe is created by this sensor element 17, which enables a first winding device 44 to carry out a magnetic induction measuring method and a second winding device 48 to carry out a layer thickness measurement according to the eddy current method, which has a small arrangement, wherein, due to the positioning of the second winding device 48 on the spherical positioning cap 21 and the formation of the at least one Archimedean coil 51, the entire sensor element 17 can be guided directly to the measuring surface of the object to be measured. Due to the dimensions of the sensor element 17, a high concentration of measuring fields—so both the magnetic induction field and the eddy current field—can be achieved. Thus, a high level of measuring sensitivity is achieved i.e. the resolution of measured values lies in a single-digit nanometer range, so in the region of 0.001 μm.

Another alternative embodiment to FIG. 2 is depicted in FIG. 5. This embodiment is different to the effect that the second coil 50 is located on the same side of the carrier 49 as the coil 51.

The invention claimed is:

1. A measuring probe for measuring the thickness of thin layers with a housing, having at least one sensor element, which is received moveably along a longitudinal axis and which comprises a magnetic pot core for receiving at least one first winding device, and which comprises a central pin arranged in the longitudinal axis of the housing, and a first and second coil of the first winding device are disposed about the central pin, and having a spherical positioning cap on the central pin pointing towards the measuring surface of the thin layer to be measured, which cap comprises a bearing surface for fitting on the measuring surface, wherein a second winding device is disposed about the spherical positioning cap, which second winding device is formed from a discoidal or annular carrier having at least one Archimedean coil, and in that a shield is provided at least partially between the first and second winding device, wherein a sleeve made from a ferritic material is provided on the spherical positioning cap and the sleeve forms the shield in a radial direction towards the second winding device.

2. The measuring probe according to claim 1, wherein the spherical positioning cap is produced from a magnetically soft material, which is optionally a part of the central pin of the pot core or is fastened thereto.

3. The measuring probe according to claim 1, wherein the spherical positioning cap has a pole cap in the bearing surface, which is formed by a hard metal coating.

4. The measuring probe according to claim 1, wherein the spherical positioning cap has a pole cap in the bearing surface, which is formed by a hard metal core or hard metal pin, which extends at least partially along the longitudinal axis of the spherical positioning cap from the bearing surface in the direction of the pot core.

5. The measuring probe according to claim 1, wherein the spherical positioning cap has, in alignment with the bearing surface, a region that is tapered in the periphery, on which the sleeve is provided.

6. The measuring probe according to claim 1, wherein a free front face of the sleeve with the bearing surface of the spherical positioning cap is rounded.

7. The measuring probe according to claim 1, wherein the sleeve extends from the bearing surface in the direction towards the pot core, wherein the length of the sleeve is greater than a thickness of the second winding device.

8. The measuring probe according to claim 1, wherein the second winding device is positioned in the region of the sleeve with respect to the spherical positioning cap.

9. The measuring probe according to claim 1, wherein at least one second Archimedean coil is provided on the carrier, which encloses the first Archimedean coil and is arranged on the same or an opposite side of the carrier.

10. The measuring probe according to claim 1, wherein at least one second Archimedean coil is provided on the carrier, which is arranged on the carrier opposite the first Archimedean coil and at least partially overlaps it.

11. The measuring probe according to claim 1, wherein the carrier consists of a semi-conductive material and comprises an implemented or inscribed circuit for the first and/or second winding device.

12. The measuring probe according to claim 11, wherein the carrier having the implemented circuit therein or the inscribed circuit thereon is arranged on an outer side of the pot core, or in the pot core, or on a front face of the pot core pointing towards the outer side of the housing.

13. The measuring probe according to claim 11, wherein the carrier having the implemented circuit is arranged between the first and second coil of the second winding device.

14. The measuring probe according to claim 1, wherein a holding element is arranged on a front face or on a section of the pot core pointing towards the first face and receives the sensor element with respect to the housing.

15. A measuring probe for measuring the thickness of thin layers with a housing, having at least one sensor element, which is received moveably along a longitudinal axis and which comprises at least one first winding device, which has a magnetic pot core arranged in the longitudinal axis of the housing, and to whose central pin a first and second coil are disposed about, and having a spherical positioning cap on the central pin pointing towards the measuring surface of the thin layer to be measured, which cap comprises a bearing surface for fitting on the measuring surface, wherein a second winding device is disposed about the spherical positioning cap, which second winding device is formed from a discoidal or annular carrier having at least one Archimedean coil, and in that a shield is provided at least partially between the first and second winding device, wherein a shielding element made from ferritic material is provided between the first and second winding device in the pot core, which forms the shield in an axial direction towards the second winding device.

16. The measuring probe according to claim 15, wherein the shielding element is formed as an annular or discoidal body, which extends from the central pin to a cylindrical inner wall section of the pot core.

17. The measuring probe according to claim 16, wherein a sleeve made from a ferritic material is provided on the spherical positioning cap, and wherein an overlap region is formed between the shielding element and the sleeve.

* * * * *